United States Patent
Asokan et al.

(10) Patent No.: US 9,154,979 B2
(45) Date of Patent: Oct. 6, 2015

(54) SCALABLE ARCHITECTURE FOR LONG TERM EVOLUTION (LTE) MULTIPLE USER EQUIPMENT (MULTI-UE) SIMULATION

(75) Inventors: Ramanathan Asokan, Cary, NC (US); Kalyan Sundhar, Cary, NC (US)

(73) Assignee: IXIA, Calabasas, CA (US)

( * ) Notice: Subject to any disclaimer, the term of this patent is extended or adjusted under 35 U.S.C. 154(b) by 361 days.

(21) Appl. No.: 13/429,384

(22) Filed: Mar. 25, 2012

(65) Prior Publication Data

US 2013/0155867 A1   Jun. 20, 2013

Related U.S. Application Data

(63) Continuation-in-part of application No. 13/326,264, filed on Dec. 14, 2011.

(51) Int. Cl.
*H04W 24/06* (2009.01)
(52) U.S. Cl.
CPC .................................... *H04W 24/06* (2013.01)
(58) Field of Classification Search
USPC ................ 370/216, 315, 328, 329, 345, 524; 455/436, 450, 474, 509
See application file for complete search history.

(56) References Cited

U.S. PATENT DOCUMENTS

| | | | |
|---|---|---|---|
| 5,561,841 A | 10/1996 | Markus | |
| 5,850,386 A | 12/1998 | Anderson et al. | |
| 6,125,072 A | 9/2000 | Wu | |
| 6,771,957 B2 | 8/2004 | Chitrapu | |
| 6,996,772 B2 | 2/2006 | Justice et al. | |
| 7,543,054 B1 | 6/2009 | Bansod et al. | |
| 7,706,347 B2 | 4/2010 | Kim et al. | |
| 7,765,313 B2 | 7/2010 | Jain et al. | |
| 8,601,585 B2 | 12/2013 | Beddoe et al. | |
| 8,724,498 B2 | 5/2014 | Choi et al. | |
| 8,738,985 B2 | 5/2014 | Deng et al. | |
| 8,793,117 B1 | 7/2014 | Varshney et al. | |
| 8,855,070 B2 | 10/2014 | Deng et al. | |
| 8,892,829 B2 | 11/2014 | Asokan | |
| 8,908,535 B2 | 12/2014 | Campbell et al. | |
| 2003/0036403 A1* | 2/2003 | Shiu et al. | 455/522 |

(Continued)

OTHER PUBLICATIONS

Notice of Allowance and Fee(s) Due for U.S. Appl. No. 13/396,577 (Dec. 18, 2013).

(Continued)

*Primary Examiner* — Michael Thier
*Assistant Examiner* — Prince A Mensah
(74) *Attorney, Agent, or Firm* — Jenkins, Wilson, Taylor & Hunt, P.A.

(57) ABSTRACT

A system for scalably simulating multiple LTE UE devices includes an LTE multi-UE simulator. The simulator includes a common public radio interface (CPRI) module for receiving downlink data from an evolved node B (eNode B) under test and a downlink signal chain processing module including a common section for performing UE agnostic processing of the downlink data and a UE specific section for performing UE specific processing of the downlink data. The simulator further includes a control digital signal processor (DSP) for receiving the downlink data from the common section of the downlink signal chain processing module, for processing downlink data to obtain control information, and for forwarding the control information to the downlink signal chain processing module. The UE specific portion of the downlink signal chain processing module performs the UE specific processing using the control information.

25 Claims, 8 Drawing Sheets

(56) References Cited

U.S. PATENT DOCUMENTS

| | | | |
|---|---|---|---|
| 2005/0220047 A1 | 10/2005 | Baey et al. | |
| 2006/0262880 A1 | 11/2006 | Mizuta et al. | |
| 2006/0276195 A1 | 12/2006 | Nordling | |
| 2007/0091921 A1* | 4/2007 | Elliot et al. | 370/468 |
| 2009/0052473 A1 | 2/2009 | Choi et al. | |
| 2009/0077456 A1 | 3/2009 | Pi et al. | |
| 2009/0077457 A1 | 3/2009 | Ramesh et al. | |
| 2009/0100300 A1* | 4/2009 | Kim et al. | 714/702 |
| 2009/0196244 A1 | 8/2009 | Chun et al. | |
| 2009/0245187 A1* | 10/2009 | Nam et al. | 370/329 |
| 2010/0075678 A1 | 3/2010 | Akman et al. | |
| 2010/0165847 A1 | 7/2010 | Kamuf et al. | |
| 2010/0184447 A1 | 7/2010 | Miki et al. | |
| 2010/0195743 A1 | 8/2010 | Barsoum et al. | |
| 2010/0272011 A1 | 10/2010 | Palanki et al. | |
| 2010/0290371 A1 | 11/2010 | Beale | |
| 2010/0303011 A1 | 12/2010 | Pan et al. | |
| 2010/0331030 A1 | 12/2010 | Nory et al. | |
| 2011/0032925 A1* | 2/2011 | Lee et al. | 370/345 |
| 2011/0044196 A1* | 2/2011 | Ishii | 370/252 |
| 2011/0076962 A1* | 3/2011 | Chen et al. | 455/68 |
| 2011/0086659 A1 | 4/2011 | Yoon et al. | |
| 2011/0110315 A1* | 5/2011 | Chen et al. | 370/329 |
| 2011/0119552 A1 | 5/2011 | Park et al. | |
| 2011/0158333 A1 | 6/2011 | Nakano et al. | |
| 2011/0170439 A1 | 7/2011 | Miki et al. | |
| 2011/0206151 A1 | 8/2011 | McCloud et al. | |
| 2011/0235586 A1 | 9/2011 | Han et al. | |
| 2011/0302390 A1* | 12/2011 | Copeland et al. | 712/2 |
| 2012/0014242 A1 | 1/2012 | Kim et al. | |
| 2012/0033650 A1 | 2/2012 | Ahn et al. | |
| 2012/0039246 A1 | 2/2012 | Zhang et al. | |
| 2012/0042226 A1 | 2/2012 | Ramesh et al. | |
| 2012/0051271 A1 | 3/2012 | Beale | |
| 2012/0063384 A1 | 3/2012 | Bi et al. | |
| 2012/0093249 A1 | 4/2012 | Sun et al. | |
| 2012/0094651 A1 | 4/2012 | Chun et al. | |
| 2012/0150521 A1 | 6/2012 | Balkwill | |
| 2012/0170524 A1 | 7/2012 | Ren et al. | |
| 2012/0204081 A1 | 8/2012 | Fresia et al. | |
| 2013/0010724 A1 | 1/2013 | Han et al. | |
| 2013/0024753 A1 | 1/2013 | Masuda et al. | |
| 2013/0034062 A1 | 2/2013 | Seo et al. | |
| 2013/0058240 A1 | 3/2013 | Kim et al. | |
| 2013/0058294 A1 | 3/2013 | Miki et al. | |
| 2013/0058306 A1 | 3/2013 | Noh et al. | |
| 2013/0060735 A1 | 3/2013 | Haddy et al. | |
| 2013/0070689 A1 | 3/2013 | Liu et al. | |
| 2013/0070690 A1 | 3/2013 | Moon et al. | |
| 2013/0088973 A1 | 4/2013 | Yang et al. | |
| 2013/0115987 A1 | 5/2013 | Yoo et al. | |
| 2013/0121168 A1 | 5/2013 | Luo et al. | |
| 2013/0121295 A1 | 5/2013 | Saito et al. | |
| 2013/0155872 A1 | 6/2013 | Subramanian et al. | |
| 2013/0155878 A1 | 6/2013 | Deng et al. | |
| 2013/0184023 A1 | 7/2013 | Asokan et al. | |
| 2013/0208600 A1 | 8/2013 | Campbell et al. | |
| 2013/0208603 A1 | 8/2013 | Choi et al. | |
| 2013/0227092 A1 | 8/2013 | Maestas | |
| 2013/0227233 A1 | 8/2013 | Asokan | |
| 2013/0275606 A1 | 10/2013 | Iyer | |
| 2014/0185425 A1 | 7/2014 | Kim et al. | |
| 2014/0269361 A1 | 9/2014 | Asokan et al. | |

OTHER PUBLICATIONS

Non-Final Office Action for U.S. Appl. No. 13/447,160 (Nov. 8, 2013).

Non-Final Office Action for U.S. Appl. No. 13/431,975 (Oct. 10, 2013).

Non-Final Office Action for U.S. Appl. No. 13/326,264 (Oct. 10, 2013).

Non-Final Office Action for U.S. Appl. No, 13/154,166 (Aug. 19, 2013).

Non-Final Office Action for U.S. Appl. No. 13/396,577 (Aug. 8, 2013).

Radio Electronics, "LTE CA: Carrier Aggregation Tutorial," pp. 1-7 http://www.radio-electronics.com/info/cellulartelecomms/lte-long-term-evolution/4g-lte-advanced-carrier-channel-aggregation.php (Printed from the Internet Aug. 7, 2013.

Share Technote, "Frame Structure—Downlink," pp. 1-11 http://www.sharetechnote.com/html/FrameStructure_DL.html#PCFICH (Printed from the Internet Aug. 7, 2013).

Non-Final Office Action for U.S. Appl. No. 13/336,005 (Jul. 2, 2013).

Non-Final Office Action for U.S. Appl. No. 13/431,975 (May 24, 2013).

Commonly assigned, co-pending U.S. Appl. No. 13/835,658 for "Methods, Systems, and Computer Readable Media for Utilizing Adaptive Symbol Processing in a Multiple User Equipment (Multi-UE) Simulator" (unpublished, filed Mar. 15, 2013).

3rd Generation Partnership Project, "Technical Specification Group Radio Access Network; Evolved Universal Terrestrial Radio Access (E-UTRA); Physical layer procedures (Release 11)," 3GPP TS 36.213, V11.2.0, pp. 1-173 (Feb. 2013).

3rd Generation Partnership Project, "Technical Specification Group Radio Access Network; Evolved Universal Terrestrial Radio Access (E-UTRA); Multiplexing and channel coding (Release 11)," 3GPP TS 36.212, V11.2.0, pp. 1-18 (Feb. 2013).

3rd Generation Partnership Project, "Technical Specification Group, Radio Access Network; Evolved Universal Terrestrial Radio Access (E-UTRA); Physical Channels and Modulation (Release 11)," 3GPP TS 36.211, V11.2.0, pp. 1-109 (Feb. 2013).

3rd Generation Partnership Project, "Technical Specification Group Radio Access Network; Evolved Universal Terrestrial Radio Access (E-UTRA); Physical layer; Measurements (Release 11)," 3GPP TS 36.214, V11.1.0, pp. 1-14 (Dec. 2012.)

3rd Generation Partnership Project, "Technical Specification Group Radio Access Network; Evolved Universal Terrestrial Radio Access (E-UTRA); LTE physical layer; General description (Release 11)," 3GPP TS 36.201, V11.1.0, pp. 1-13 (Dec. 2012).

3rd Generation Partnership Project, "Technical Specification Group Radio Access Network; Evolved Universal Terrestrial Radio Access (E-UTRA); Physical layer for relaying operation (Release 11)," 3GPP TS 36.215, V11.0.0, pp. 1-16 (Sep. 2012).

Xiao et al., "IMS Network Deployment Cost Optimization Based on Flow-Based Traffic Model," IEEE/IFIP Network Operations and Management Symposium—NOMS 2010, pp. 232-239 (2010).

"Network Topology," http://web.archive.org/web/20081219235147/http://en.wikipedia.org/wiki/Network_topology, pp. 1-9 (Dec. 19, 2008).

Commonly assigned, co-pending U.S. Appl. No. 13/447,160 for "Methods, Systems, and Computer Readable Media for Heuristics-Based Adaptive Protocol Parsing," (unpublished, filed Apr. 13, 20120).

Commonly assigned, co-pending U.S. Appl. No. 13/431,975 for "Methods, Systems, and Computer Readable Media for Dynamically Controlling a Turbo Decoding Process in a Long Term Evolution (LTE) Multi-User Equipment (UE) Traffic Simulator," (unpublished, filed Mar. 28, 2012).

Commonly assigned, co-pending U.S. Appl. No. 13/408,787 for "Methods, Systems, and Computer Readable Media for Integrated Sub-Block Interleaving and Rate Matching," (unpublished, filed Feb. 29, 2012).

Commonly assigned, co-pending U.S. Appl. No. 13/396,577 for "Methods, Systems, and Computer Readable Media for Performing Long Term Evolution (LTE) Channel Delineation," (unpublished, filed Feb. 14, 2012).

Commonly assigned, co-pending U.S. Appl. No. 13/371,389 for "Methods, Traffic Simulators, and Computer Readable Media for Validating Long Term Evolution (LTE) Code Blocksand Transport Blocks," (unpublished, filed Feb. 10, 2012).

Commonly assigned, co-pending U.S. Appl. No. 13/352,058 for "Methods, Systems, and Computer Readable Media for Long Term Evolution (LTE) Uplink Data Processing," (unpublished, filed Jan. 17, 2012).

Commonly assigned, co-pending U.S. Appl. No. 13/336,005 for "Methods, Systems, and Computer Readable Media for Reducing the

(56) References Cited

OTHER PUBLICATIONS

Impact of False Downlink Control Information (DCI) Detection in Long Term Evolution (LTE) Physical Downlink Control Channel (PDCCH) Data," (unpublished, filed Dec. 23.
Commonly assigned, co-pending U.S. Appl. No. 13/326,264 for "Methods, Systems, and Computer Readable Media for Improved Long Term Evolution (LTE) Hybrid Automatic Repeat Request (HARQ) Processing," (unpublished, filed Dec. 14, 2011).
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 v.9.9.0 (Dec. 2011).
"3rd Generation Partnership Project; Universal Mobile Telecommunications System (UMTS); Evolved Univeral Terrestrial Radio Access (E-UTRA); Physical layer for relaying operation (Release 10)," 3GPP TS 36.216, v10.3.1 (Sep. 2011).
"3rd Generation Partnership Project; Technical Specification Group Radio Access Network; Evolved Universal Terrestrial Radio Access (E-UTRA); Physical layer procedures (Release 10)," 3GPP TS 36.213, V10.3.0 (Sep. 2011).
"3rd Generation Partnership Project; Technical Specification Group Radio Access Network; Evolved Universal Terrestrial Radio Access (E-UTRA); Multiplexing and channel coding (Release 10)," 3GPP TS 36.212, V10.3.0 (Sep. 2011).
"3rd Generation Partnership Project; Technical Specification Group Radio Access Network; Evolved Universal Terrestrial Radio Access (E-UTRA); Physical Channels and Modulation (Release 10)," 3GPP TS 36.211, V10.3.0 (Sep. 2011).
"LTE; Evolved Universal Terrestrial Radio Access (E-UTRA); Physical layer; Measurements 3GPP TS 36.214 version 10.1.0 Release 10)," ETSI TS 136 214, V10.1.0 (Apr. 2011).
Third Generation Partnership Project, "Technical Specification Group Radio Access Network; Evolved Universal Terrestrial Radio Access (E-UTRA); LTE Physical Layer; General Description," 3GPP TS 36.201 v10.0.0, Release 10 (Dec. 2010).
"IxCatapult Chassis," http://www.ixiacom.com/products/display?skey=ch_ixcatapult, pp. 1-2 (Downloaded from the Internet Apr. 14, 2010).
"Wireless Network Testing," Ixia, 915-2623-01 Rev A, pp. 1-18 (Jan. 2010).
"Wireless Network Testing," Ixia, 915-2622-01 Rev A, pp. 1-16 (Jan. 2010).
"3rd Generation Partnership Project; Technical Specification Group Radio Access Network; Requirements for Evolved UTRA (E-UTRA) and Evolved Utran (E-UTRAN) (Release 9)," 3GPP TR 25.913, v9.0.0 (Dec. 2009).
"PDCCH Blind Decoding," PDCCH Decoding Example, http://www.steepestascent.com, pp. 1-6 (Copyright 2009-2011, dowloaded from the Internet Dec. 4, 2011).
Notice of Allowance and Fee(s) Due for U.S. Appl. No. 13/408,787 (Jul. 18, 2014).
Non-Final Office Action for U.S. Appl. No. 13/447,160 (Jul. 10, 2014).
Notice of Allowance and Fee(s) Due for U.S. Appl. No. 13/326,264 (Jun. 9, 2014).
Notice of Allowance and Fee(s) Due for U.S. Appl. No. 13/154,166 (Jun. 2, 2014).
Advisory Action for U.S. Appl. No. 13/447,160 (May 29, 2014).
Applicant-Initiated Interview Summary for U.S. Appl. No. 13/447,160 (May 23, 2014).
Applicant-Initiated Interview Summary for U.S. Appl. No. 13/154,166 (Apr. 28, 2014).
Final Office Action for U.S. Appl. No. 13/447,160 (Mar. 18, 2014).
Final Office Action for U.S. Appl. No. 13/154,166 (Mar. 3, 2014).
Final Office Action for U.S. Appl. No. 13/336,005 (Feb. 26, 2014).
Interview Summary for U.S. Appl. No. 13/447,160 (Feb. 25, 2014).
Final Office Action for U.S. Appl. No. 13/326,264 (Feb. 20, 2014).
Non-Final Office Action for U.S. Appl. No. 13/408,787 (Feb. 3, 2014).
Notice of Allowance and Fee(s) Due for U.S. Appl. No. 13/431,975 (Jan. 22, 2014).
Notification of Transmittal of the International Search Report and the Written Opinion of the International Searching Authority, or the Declaration for International Application No. PCT/US2012/070877 (Mar. 28, 2013).
3rd Generation Partnership Project, "Technical Specification Group Radio Access Network; Evolved Universal Terrestrial Radio Access (E-UTRA); Physical layer for relaying operation (Release 11)," 3GPP TS 36.216, V11.0.0, pp. 1-16 (Sep. 2012).
Ikuno et al., "System level simulation of LTE networks," 2010 IEEE 71st Vehicular Technology Conference: VTC2010-Spring, (May 16-19, 2010).
Abbes et al., "Protocol Analysis in Intrusion Detection Using Decision Tree," Proceedings of the International Conference on Information Technology: Coding and Computing (ITCC'04), pp. 1-5 (2004).
Sleator et al., "Self-Adjusting Binary Search Trees," Journal of the Association for Computing Machinery. vol. 32, No. 3, pp. 652-686 (Jul. 1985).
Advisory Action Before the Filing of an Appeal Brief for U.S. Appl. No. 13/447,160 (Mar. 5, 2015).
Notice of Allowance and Interview Summary of U.S. Appl. No. 13/352,058 (Feb. 5, 2015).
Final Office Action for U.S. Appl. No. 13/447,160 (Dec. 19, 2014).
Non-Final Office Action and Examiner-Initated Interview Summary for U.S. Appl. No. 13/336,005 (Dec. 4, 2014).
Non-Final Office Action for U.S. Appl. No. 13/154,166 (Oct. 28, 2014).
Notice of Publication for GB Patent Application No. 1411056.3 (Aug. 11, 2014).
Notice of Allowance and Fee(s) Due for U.S. Appl. No. 13/371,389 (Aug. 8, 2014).
Non-Final Office Action for U.S. Appl. No. 13/352,058 (Aug. 4, 2014).
Dahlman et al., "10.4.9: Blind Decoding of PDCCHs," 4G LTE / LTE-Advanced for Mobile Broadband, pp. 199-202 (2011).
"DCT2000 LTE UE Simulation API Manual," Release 17.1, Catapult Communications, pp. 1-106 (May 2009).
"Catapult Communications Announces High-Capacity LTE UE Simulation Test System," Catapult Communications Corporation, pp. 1-2 (Feb. 9, 2009).
Dutta et al., "A Tight Lower Bound for Parity in Noisy Communcations Networks," Tata Institute of Fundamental Research, pp. 1056-1065 (2008).
"LTE (Long Term Evolution) Testing Systems," http://www.catapult.com/technologies/tech_lte.htm, pp. 1-2 (Jun. 26, 2008).

\* cited by examiner

SCALABLE ARCHITECTURE FOR LONG TERM EVOLUTION (LTE) MULTIPLE USER EQUIPMENT (MULTI-UE) SIMULATION

PRIORITY CLAIM

This application is a continuation-in-part of U.S. patent application Ser. No. 13/326,264, filed Dec. 14, 2011.

TECHNICAL FIELD

The subject matter described herein relates to methods and systems for simulating LTE user devices for testing telecommunications network equipment. More particularly, the subject matter described herein relates to scalable architecture for LTE multi-UE simulation.

BACKGROUND

Mobile communications networks are moving to the LTE standards defined by the Third Generation Partnership Project (3GPP). The LTE physical layer, which provides physical layer communications between user equipment (UE), such as mobile handsets, and evolved node Bs (eNode Bs) is defined in 3GPP TS 36.201 and TSs 36.211-216. The LTE physical layer provides modulation, physical channels, channel coding, and other aspects of physical layer communications between a UE and an eNode B Before LTE equipment, such as eNode Bs, can be placed into service, the equipment must be tested under operational or simulated operational conditions. For example, in operation, an eNode B is required to handle simultaneous communications from multiple UEs. Accordingly, it is desirable for LTE test equipment to simulate multiple UE devices, including meeting all the timing requirements of the above-referenced LTE physical layer standards.

One particular timing requirement that must be met is the processing of a downlink radio frame in sufficient time for transmission of the corresponding uplink radio frame. In LTE networks, the downlink direction refers to transmission from the eNode B to the UE, and the uplink direction refers to transmission from the UE to the eNode B. The LTE physical layer defines a radio frame that is ten milliseconds in length and has ten subframes of one millisecond each. In the downlink direction, the physical downlink control channel (PDCCH) carries control information referred to as downlink control information or DCI. User data for plural UEs is carried on the physical downlink shared channel (PDSCH). The downlink DCI for subframe n is for the PDSCH data in the same subframe. The uplink DCI on subframe n has scheduling information for the physical uplink shared channel (PUSCH) in subframe n+4. This means that the UE or UE simulator has about four milliseconds from the time of reception of the scheduling information on the downlink signal to begin transmission of the corresponding uplink signal. In order to meet this constraint, the UE or multi-UE simulator needs to complete downlink processing, decode the downlink DCI, send grant information to a higher layer, get the protocol data unit (PDU) segmented from the radio link control (RLC) layer, perform all of the physical layer processing and modulation, and start transmission on the uplink. These and other timing requirements must be performed for each UE being simulated. Accordingly, there exists a need for a scalable architecture for LTE multi-UE simulation.

SUMMARY

The subject matter described herein includes a scalable architecture for LTE multi-UE simulation. According to one aspect, the subject matter described herein includes a system for scalably simulating multiple LTE UE devices. The system includes an LTE multi-UE simulator. The simulator includes a common public radio interface (CPRI) module for receiving downlink data from an evolved node B (eNode B) under test. The simulator further includes a downlink signal chain processing module including a common section for performing UE agnostic processing of the downlink data and a UE specific section for performing UE specific processing of the downlink data. The simulator further includes a control digital signal processor (DSP) for receiving the downlink control data from the common section of the downlink signal chain processing module, for processing downlink data to obtain control information, and for forwarding the control information to the downlink signal chain processing module. The UE specific portion of the downlink signal chain processing module performs the UE specific processing using the control information.

The subject matter described herein for scalable simulation of multiple LTE UE devices can be implemented using a non-transitory computer-readable medium having stored thereon executable instructions that when executed by the processor of a computer control the computer to perform steps. Exemplary computer-readable media suitable for implementing the subject matter described herein include disk memory devices, chip memory devices, programmable logic devices, such as field programmable gate arrays (FPGAs), and application specific integrated circuits. In addition, a computing platform that implements the subject matter described herein may be located on a single device or computing platform or may be distributed across plural devices or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1A:
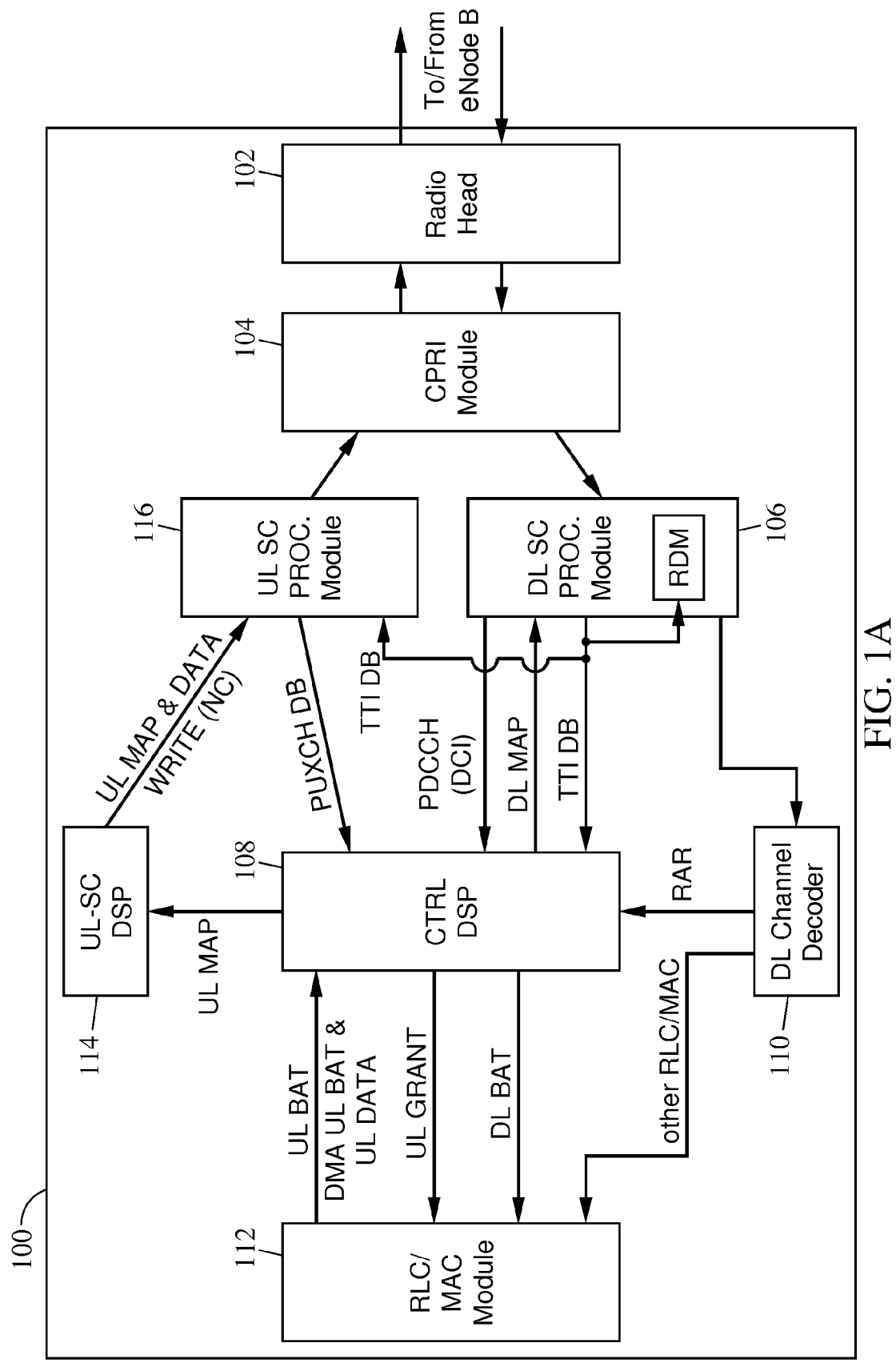
FIG. 1A is a block diagram illustrating an LTE multi-UE simulator according to an embodiment of the subject matter described herein.

The subject matter described herein includes a scalable architecture for simulating multiple LTE UE devices. FIG. 1A is a block diagram illustrating an exemplary overall architecture for a multi-UE simulator according to an embodiment of the subject matter described herein. Referring to FIG. 1A, an LTE multi-UE simulator 100 includes a radio head 102 for sending data to and receiving data from an eNode B over a radio interface. Radio head 102 interfaces with a common public radio interface (CPRI) module 104. CPRI module 104 receives the data in the downlink direction for further processing and sends data in the uplink direction to radio head 102. Radio head 102 may be internal to or external to LTE multi-UE simulator 100. For example in one test scenario, radio head 202 may be omitted or bypassed, and CPRI module 204 may connect to a corresponding CPRI interface of an eNode B under test via a wired interface, such as an optical fiber interface.

A downlink signal chain processing module 106 receives downlink data and control information from CPRI module 104. Downlink signal chain processing module 106 forwards the received downlink control information to a control DSP 108. Control DSP 108 processes the downlink control information to produce descriptors for subsequent routing of the data and to produce resource maps (i.e., frequency, modulation, data block size, etc.) for decoding the downlink data. Control DSP 108 provides the resource maps data to downlink signal chain processing module 106. Control DSP 108 also performs some MAC layer processing, as will be described in detail below. Downlink signal chain processing module 106 sends the downlink data to downlink channel decoder 110. Downlink channel decoder 110 decodes the downlink data using a specified algorithm, such as Turbo decoding.

According to an aspect of the subject matter described herein, downlink channel decoder 110 may also perform decision directed routing of the downlink data. Decision directed routing includes identifying and sending some radio link control/medium access control (RLC/MAC) data to control DSP 108 and sending other RLC/MAC data to an RLC/MAC module 112. Typically, a downlink channel decoder, such as downlink channel decoder 110 decodes data without knowing the type of data that it is decoding. According to an aspect of the subject matter described herein, downlink channel decoder 110 determines whether information is to be sent to RLC/MAC processing module 112 or control DSP 108 using a descriptor that indicates the data type, where the descriptor is generated by control DSP 108 and transferred to downlink channel decoder 110 via downlink signal chain processing module 106. This mechanism will now be described in detail.

As illustrated in FIG. 1A, downlink signal chain processing module 106 sends the physical downlink control channel (PDCCH) data to control DSP 108. PDCCH is the physical channel that carries downlink control information from the eNode B to the UE. The control information includes the downlink control information (DCI), which is used to decode the physical downlink shared channel (PDSCH) data. The PDSCH data is passed from CPRI module 104 to downlink signal chain processing module 106. Downlink signal chain processing module 106 performs both UE-agnostic and UE-specific processing of the PDSCH data and forwards the data to downlink channel decoder 110. The UE-agnostic and UE-specific processing performed by downlink signal chain processing module 106 will be described in detail below.

The PDSCH channel is shared by plural users. The PDSCH channel also carries different types of data, including user-specific data, system information (cell specific—common to all users), paging data, and random access response (RAR) data. All data except for RAR data requires processing by RLC/MAC module 112. RAR data is needed to generate the uplink signal, because RAR data contains uplink grant information (uplink resource allocation) used by the RLC/MAC layer to send uplink data. Since uplink grant data is specific to an uplink subframe, there is a strict time constraint for processing RAR data, generating the appropriate grant information to the higher layer, and transmitting the data on the uplink channel.

One possibility for implementing RAR processing would be for the processing to be performed by RLC/MAC module 112. However, in order to meet the time constraints, the subject matter described herein locates RAR processing in control DSP 108. Accordingly, there is a need to route the RAR data to control DSP 108 and other RLC/MAC data on the PDSCH to RLC/MAC module 112.

As stated above, PDSCH data from channel decoder 110 is either routed to control DSP 108 or RLC/MAC module 112. However, a downlink channel decoder is typically unaware of the type of data that it is decoding. In a previous implementation of multi-UE simulator 100, downlink channel decoder 110 always transmitted data to a downlink DSP, and the downlink DSP decides to route all downlink data, except the RAR data, to RLC/MAC module 112. However, with the present architecture, the decision logic of where to route the message is performed by downlink channel decoder 110 using descriptor information generated by control DSP 108, and the downlink DSP is omitted.

In order to provide downlink channel decoder 110 with the descriptor information needed for performing decision directed routing, control DSP 108 decodes the physical downlink control channel (PDCCH), which has all the control information used to decode the PDSCH data. Control DSP 108 creates descriptor data that identifies the data types, such as RAR and the other types of data referenced above. Control DSP 108 sends the descriptor data to downlink signal chain processing module 106. The types of descriptors passed to downlink signal chain processing module 106 include a resource block map, a PDSCH descriptor, a transport block descriptor, etc. Downlink signal chain processing module 106 performs demodulation, descrambling, and rate de-matching, and passes the data to downlink channel decoder 110 along with the descriptors. Downlink channel decoder 110 performs channel decoding, such as Turbo decoding, and decision directed routing. In performing decision directed routing, downlink channel decoder 110 reads the descriptors to identify the various types of RLC/MAC data and forwards the RAR data to control DSP 108. The other types of RLC/MAC data are sent to RLC/MAC module 112.

On the uplink side, uplink signal chain DSP 114 receives uplink mapping data generated from uplink grant information from control DSP 108 and receives uplink data from RLC/MAC layer module 112. Uplink signal chain DSP 108 provides the uplink data to uplink signal chain processing module 116. Control DSP 108 also provides a resource mapping (i.e., frequencies, modulation, etc. to uplink signal chain processing module 116, which uses the mappings to formulate uplink modulated signal using transport block data received from MAC/RLC layer module 112. Uplink signal chain processing module 116 sends the uplink modulated signal to CPRI module 104, which sends the transport blocks to radio head 102 for transmission to the eNode B over an LTE wireless link. Alternatively, as set forth above, in some test implementations, radio head 102 can be bypassed or omitted, and CPRI module 104 sends the data to the eNodeB under test over a wired interface.

Figure 1B:
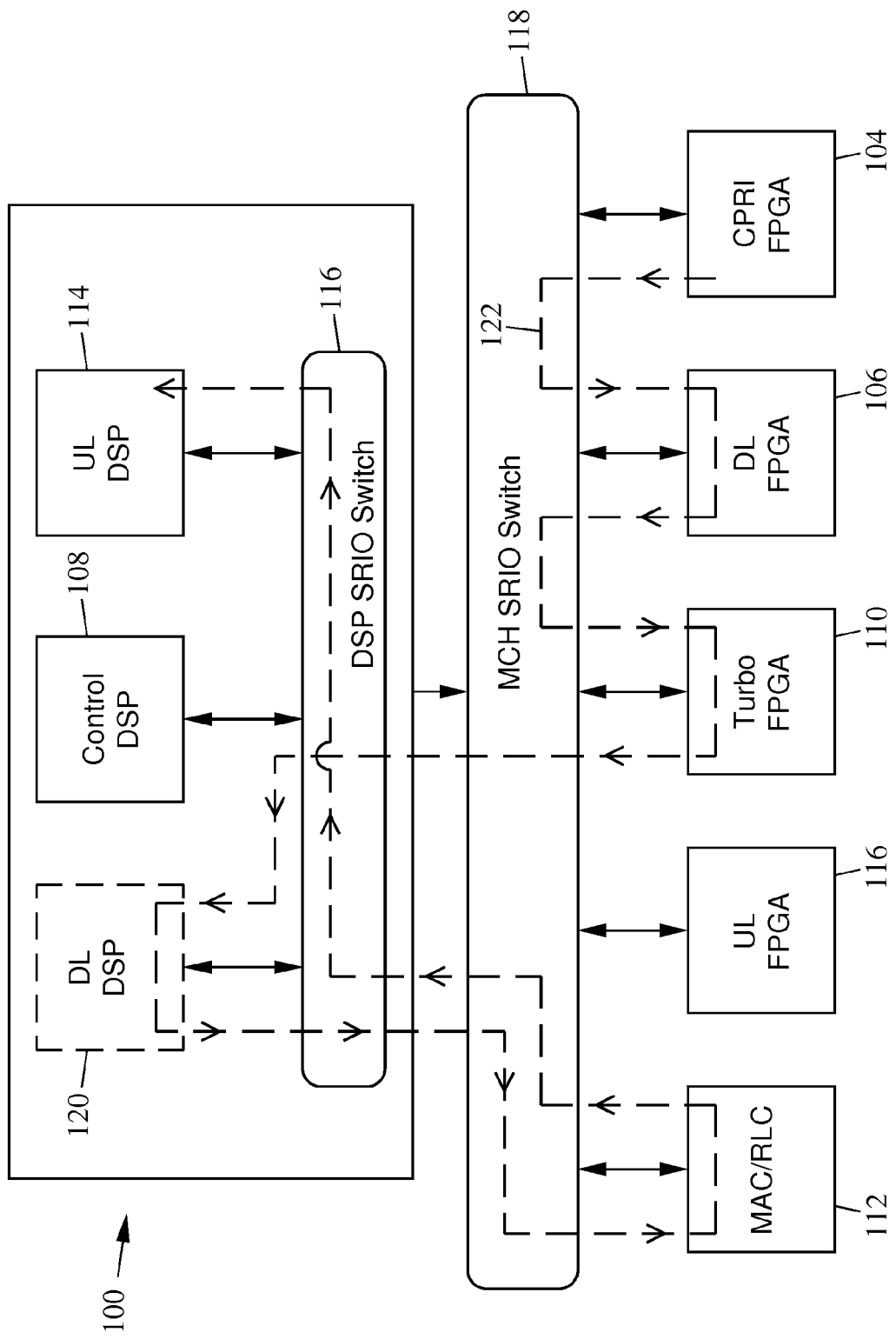
FIG. 1B is a block diagram illustrating exemplary bus interfaces and arrangement of modules of an LTE multi-UE simulator according to an embodiment of the subject matter described herein.

FIG. 1B is a block diagram illustrating the physical architecture for simulator 100. In FIG. 1B, simulator 100 includes separate downlink and uplink FPGAs 106 and 116 for separating downlink from uplink signal chain processing. Simulator 100 also includes a common CPRI FPGA 104 for performing CPRI interface processing between FPGAs 106 and 116 and the radio interface (not shown in FIG. 1B). Control DSP 108 controls the overall operation of uplink and downlink FPGAs 106 and 116 and MAC/RLC module 112. MAC/RLC module 112 may perform layer 2 and higher functions and may interface with the physical layer. Downlink channel decoder 110 in the illustrated embodiment is a dedicated decoder that performs Turbo decoding of downlink data. Uplink DSP 114 provides the uplink map and data to uplink FPGA 116 for transmission of the radio interface via CPRI FPGA 104. The modules illustrated in FIG. 1B are interconnected via serial rapid I/O (SRIO) switches 116 and 118. The timing among modules illustrated in FIG. 1B may be interrupt driven where doorbells or timing ticks are communicated between the modules to synchronize their operation. For example, returning to FIG. 1, downlink signal chain processing module 106 may send a doorbell or tick signal to control DSP 108 and to uplink signal chain processing module to synchronize these devices.

In the architecture illustrated in FIG. 1B, a downlink DSP 120 is shown in dashed lines representing the configuration of a previous architecture. In this previous architecture indicated by dashed line 122, all downlink data arriving at CPRI FPGA 104 is forwarded to downlink FPGA 106, to Turbo FPGA 110, to downlink DSP 120. Then, the downlink DSP 120 routes the RAR MAC data to Control DSP 108 to decode and generate uplink grant information, and all other RLC MAC data to MAC/RLC module 112. However, as set forth above, the downlink DSP is preferably omitted and decision-directed routing performed by Turbo FPGA 110 to route downlink RAR data to control DSP 108 and other layer 2 and higher data to MAC/RLC module 112. Control DSP 108 generates uplink grant information from the RAR data and provides the uplink grant information to MAC/RLC module 112 and the uplink MAP information to uplink DSP 114. MAC/RLC module generates uplink data blocks using the grant information and the uplink data sent to Uplink DSP 114, Thus, omitting the downlink DSP and routing the RAR data directly from Turbo FPGA 110 to control DSP 108 eliminates the need for all MAC/RLC data to first travel to downlink DSP 120, and then to either MAC/RLC module 112 or control DSP 108.

Figure 2:
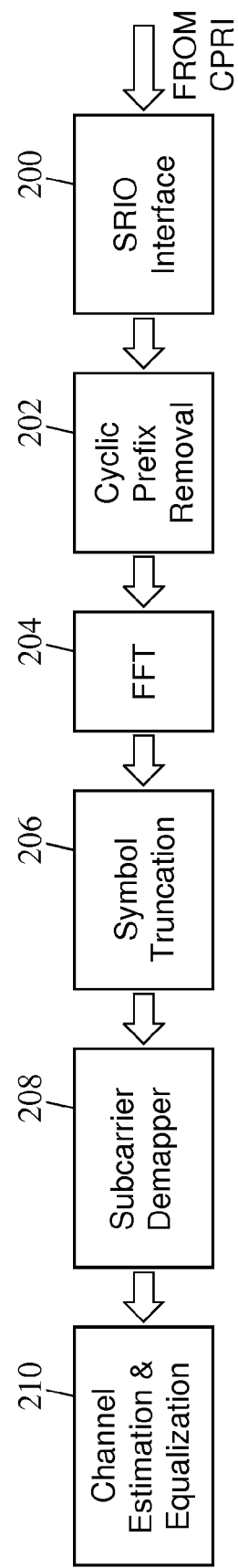
FIG. 2 is a block diagram illustrating a common section of a downlink signal chain processing module according to an embodiment of the subject matter described herein.

According to an aspect of the subject matter described herein, downlink signal chain processing is performed in a hierarchical manner. That is, downlink signal chain processing is divided into a UE-agnostic section and a UE-specific section. Each of these sections may be implemented by downlink signal chain processing module 106. FIG. 2 is a block diagram illustrating the UE-agnostic section of downlink signal chain processing performed by downlink signal chain processing module 106. Referring to FIG. 2, the UE-agnostic portion includes a serial rapid input/output (SRIO) 200 that interfaces with an SRIO switch that interconnects the modules illustrated in FIG. 1A. A cyclic prefix removal block 202 removes cyclic prefixes from incoming transport blocks. An FFT block 204 performs fast Fourier transform (FFT) processing of the downlink signal to produce individual frequency components. A symbol truncation block 206 performs truncation symbols in the downlink signal to reduce the bit resolution. A subcarrier de-mapper 208 performs subcarrier de-mapping of the downlink signal to separate the signal into resource elements with common subcarriers. A channel estimation and equalization block 210 performs channel estimation and equalization on the downlink signal.

Figure 3:
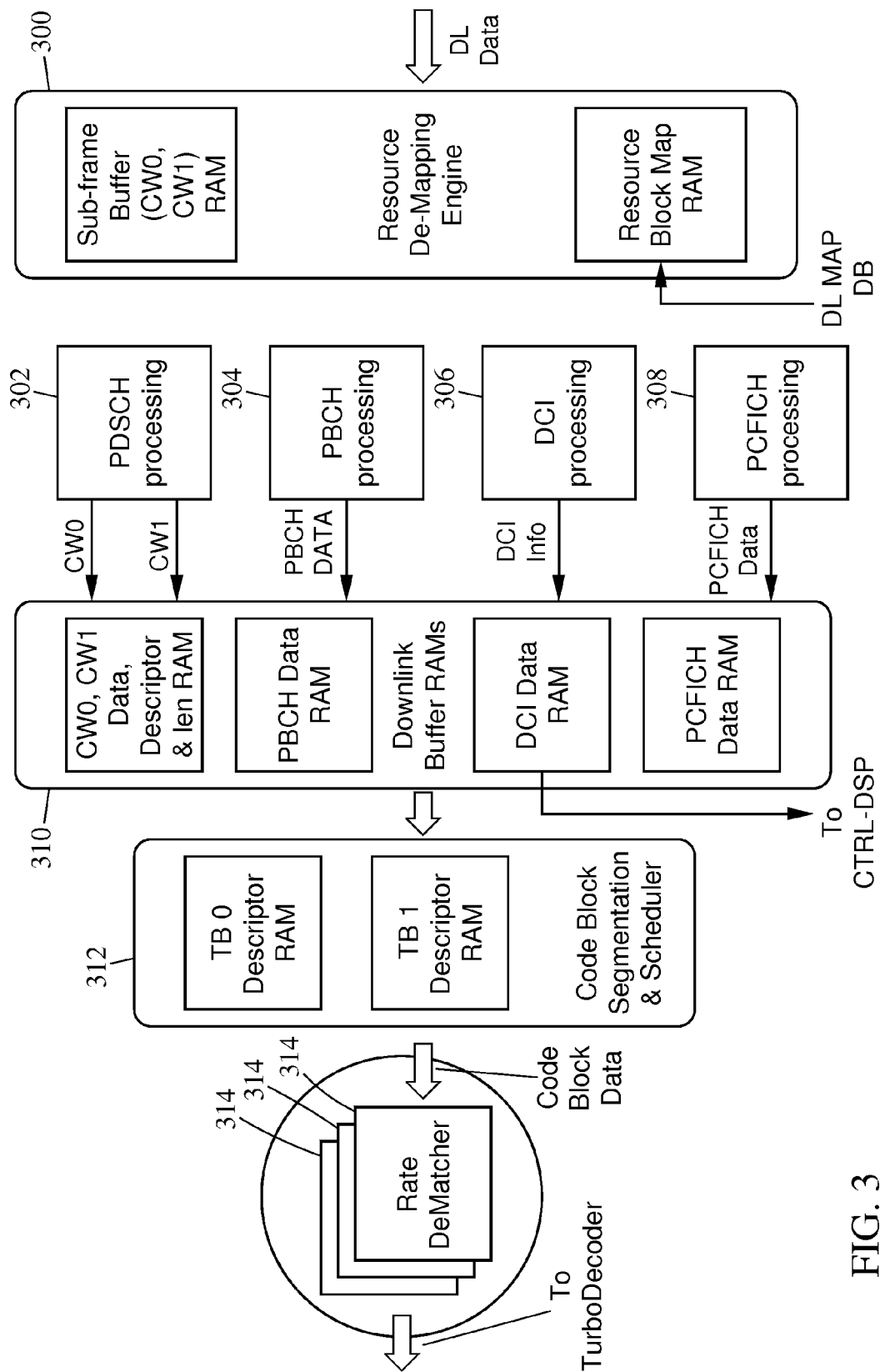
FIG. 3 is a is a block diagram illustrating a UE specific section of a downlink signal chain processing module that performs channel and transport block processing according to an embodiment of the subject matter described herein.

FIG. 3 illustrates the channel and transport block processing of a UE and channel specific section of downlink signal chain processing module 106 according to an embodiment of the subject matter described herein. Referring to FIG. 3, a resource de-mapping engine 300 receives downlink map data from control DSP 108 and the downlink data from the UE agnostic section of downlink signal chain processing module 106. Blocks 302, 304, 306, and 308 each perform channel-specific processing. For example, block 302 processes the physical downlink shared channel. The PDSCH processing performed by block 302 may be performed sequentially on a per UE basis. Alternatively, data for at least some UEs may be processed in parallel. Block 304 processes the physical broadcast shared channel. Block 306 processes the downlink control information. Block 308 processes the physical control format indicator channel. The output of blocks 302-308 is provided to downlink buffer RAMs 310. Control DSP 108 may read the DCI value from downlink buffer RAMs 310. A code block segmentation and scheduler 312 provides code block data to rate de-matchers 314 for each channel. Block 312 also stores the descriptors for the downlink data that are usable by downlink channel decoder 110 to perform decision directed routing as described above. Rate de-matchers 314 provide the code blocks and the descriptors to downlink channel decoder 110.

Figure 4:
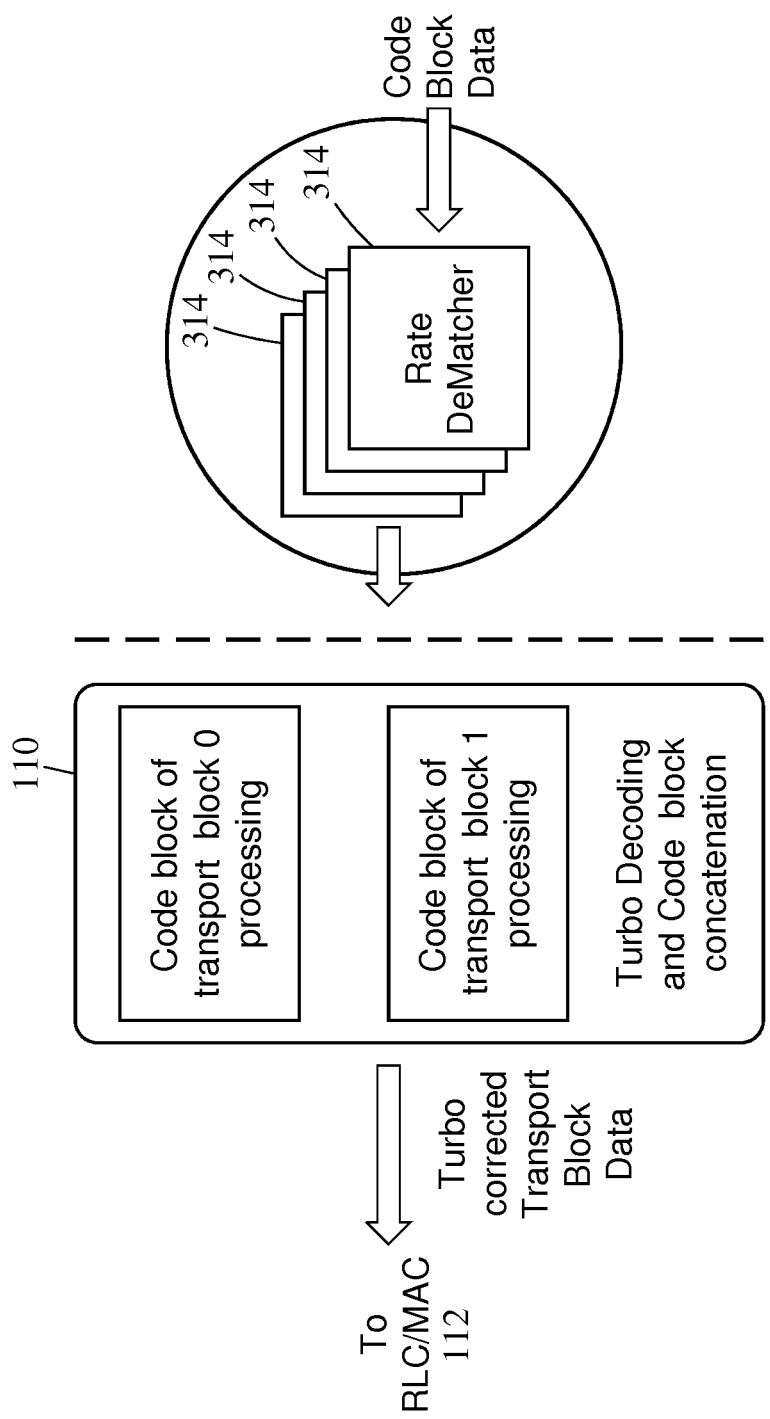
FIG. 4 is a block diagram illustrating transport block processing performed by a Turbo channel decoder according to an embodiment of the subject matter described herein.

FIG. 4 illustrates Turbo decoding of the downlink data. In FIG. 4, downlink channel decoder 110 receives the code block data from rate de-matchers 314. Downlink channel decoder 110 outputs corrected code block data to RLC/MAC module 112. As indicated above, downlink channel decoder 110 may forward RAR data to control DSP 108.

Figure 5A:
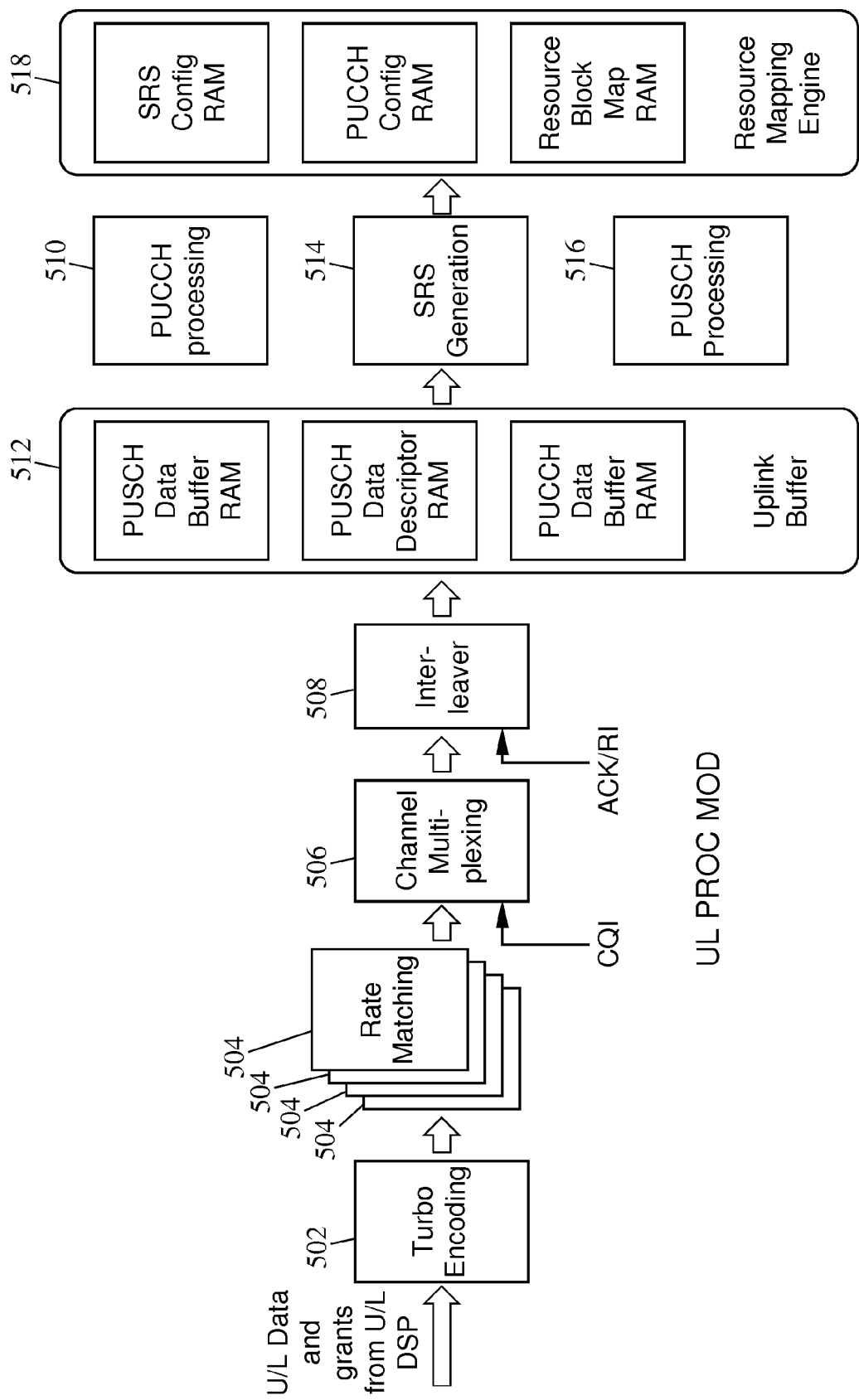
FIG. 5A is a block diagram illustrating exemplary UE-specific processing performed by an uplink signal chain processing module according to an embodiment of the subject matter described herein.

Like the downlink signal chain, the uplink signal chain may be divided into a UE specific phase or section and a UE agnostic section. FIG. 5A illustrates an exemplary UE specific section of an uplink signal chain processing as implemented by simulator 100 according to an embodiment of the subject matter described herein. Referring to FIG. 5A, channel coder 502 receives uplink data and descriptor from uplink DSP 114, channel coder 502 performs Turbo encoding of the channel data. Rate matcher 504 performs rate matching of the uplink data to the available data rates of the physical channel. Channel multiplexer 506 and interleaver 508 multiplex and interleave the uplink channel data. Physical uplink control channel processing block 510 processes the physical uplink control channel data stored in uplink buffer 512. Sound reference signal (SRS) generation block 514 generates SRS signals usable by the eNode B to estimate uplink channel quality. Physical uplink shared channel processing block 516 processes the physical uplink shared channel data in uplink buffer 512. A resource mapping engine 518 maps the physical channel data into an uplink signal transport block based on the resource map received from control DSP 108.

Figure 5B:
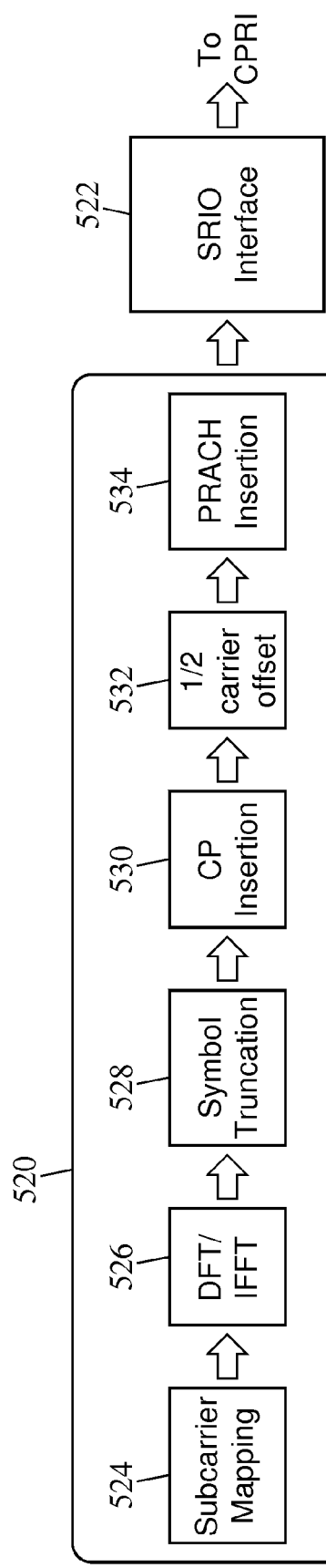
FIG. 5B is a block diagram illustrating exemplary UE-agnostic processing performed by an uplink signal chain processing module according to an embodiment of the subject matter described herein.

FIG. 5B illustrates exemplary UE-agnostic processing performed by uplink signaling chain processing module 114. Referring to FIG. 5B, a symbol processing block 520 performs various symbol processing operations on the uplink transport blocks before sending them over the SRIO interface 522 to CPRI module 104. Exemplary symbol processing blocks illustrated in FIG. 6B include subcarrier mapping 524, DFT coding and inverse fast Fourier transform 526, symbol truncation 528, CP insertion 530, 1/2 carrier offset 532, and physical random access channel insertion 534.

Figure 6:
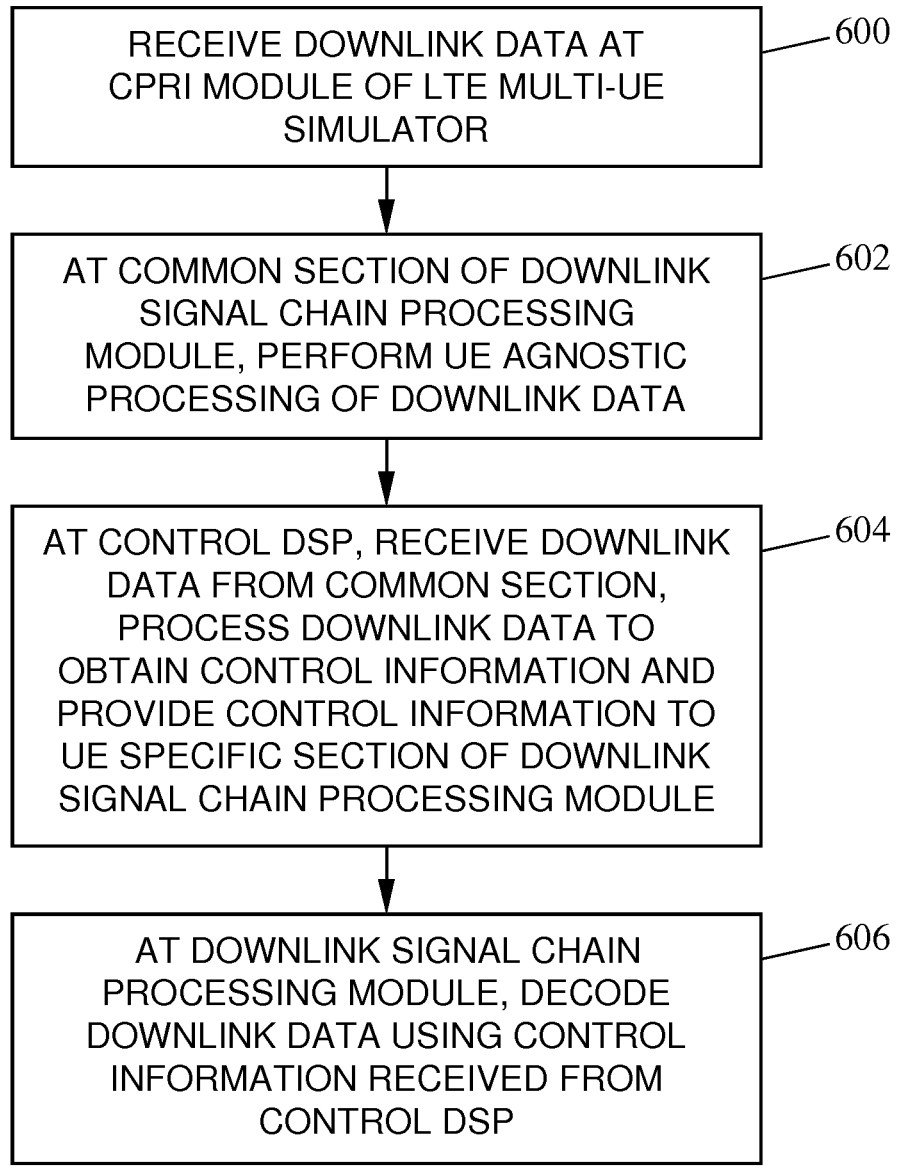
FIG. 6 is a flow chart illustrating exemplary steps for simulating multiple LTE UE devices according to an embodiment of the subject matter described herein.

FIG. 6 is a flow chart illustrating exemplary overall steps for scalable multi-UE simulation according to an embodiment of the subject matter described herein. Referring to FIG. 6, in step 600, at a CPRI module of an LTE multi-UE simulator, downlink data is received from a radio interface. In step 602, the downlink data from CPRI module 104 is provided to a common section of downlink signal chain processing module 106. In step 604, the downlink data processed by the common section is provided to control DSP 108, which obtains downlink channel mapping information from memory accessible by control DSP 108 for the downlink data. In step 606, control DSP 108 provides the downlink channel resource mapping information to a UE specific portion of downlink signal chain processing module 106. In step 608, the UE specific section of the downlink signal chain processing module 106 uses the downlink channel resource mapping information to decode the downlink data.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for scalably simulating multiple long term evolution (LTE) user equipment (UE) devices, the system comprising:
   an LTE multi-UE simulator distinct from an evolved node B and user equipment, the LTE multi-UE simulator comprising:
      a common public radio interface (CPRI) module for receiving downlink data associated with multiple UEs simulated by the LTE multi-UE simulator from an evolved node B (eNode B) under test;
      a downlink signal chain processing module including a common section for performing UE agnostic processing of the downlink data and a UE specific section for performing UE specific processing of the downlink data for each of the multiple UEs simulated by the LTE multi-UE simulator; and
      a control digital signal processor (DSP) for receiving the downlink data from the common section of the downlink signal chain processing module, for processing the downlink data to obtain control information, and for forwarding the control information to the downlink signal chain processing module, wherein the UE specific section performs the UE specific processing using the control information.

2. The system of claim 1 wherein the common section includes a bus interface for receiving the downlink data from the CPRI module, a cyclic prefix removal block for removing a cyclic prefix from the downlink data, a symbol truncation block for truncating symbols in the downlink data, a subcarrier demapper for removing a subcarrier signal from the downlink data, and a channel estimation and equalization block for performing channel estimation and equalization of a signal carrying the downlink data.

3. The system of claim 1 wherein the UE specific section includes a plurality of control signal processing blocks to process control signals present in the downlink data, an interface for communicating with the control DSP, a code block segmentation and scheduler for segmenting the downlink data into code blocks, and a rate dematcher for deinterleaving the downlink data in the code blocks.

4. The system of claim 1 wherein the LTE multi-UE simulator includes a downlink channel decoder for receiving the downlink data from the downlink signal chain processing module and for performing decision directed routing at the downlink channel decoder for sending a first portion of the downlink data to the control DSP and for sending a second portion of the downlink data to a radio link control (RLC) and medium access control (MAC) module for further processing.

5. The system of claim 4 wherein the first portion of the downlink data includes random access response (RAR) data and wherein the second portion of the downlink data includes RLC/MAC data other than the RAR data.

6. The system of claim 5 wherein the control DSP imbeds a descriptor in the control information returned to the downlink signal chain processing module, wherein the downlink signal chain processing module forwards the descriptor to the downlink channel decoder, and wherein the downlink channel decoder uses the descriptor in identifying the RAR data and the RLC/MAC data other than the RAR data.

7. The system of claim 4 wherein the downlink channel decoder comprises a Turbo decoder.

8. The system of claim 1 wherein the UE specific section is configured to process downlink data for a plurality of different channels corresponding to the UEs being simulated by the LTE multi-UE simulator.

9. The system of claim 5 wherein the control DSP processes the RAR data to extract uplink grant information, wherein the LTE multi-UE simulator comprises an uplink DSP for receiving uplink grant information from the control DSP and using the uplink grant information to generate uplink transport blocks, and wherein the LTE multi-UE simulator further includes an uplink signal chain processing module for receiving the uplink transport blocks and sending the uplink transport blocks to the CPRI module.

10. The system of claim 9 wherein the uplink signal chain processing module includes a UE-specific section for performing UE-specific processing of the uplink transport blocks and a UE-agnostic section for performing UE-agnostic processing of the uplink transport blocks.

11. The system of claim 9 wherein the uplink and downlink signal chain processing modules are implemented using separate field programmable gate arrays (FPGAs).

12. The system of claim 1 wherein the control DSP is configured to process the downlink data and return the control information to the downlink signal chain processing module within 400 microseconds.

13. A method for scalably simulating multiple long term evolution (LTE) user equipment (UE) devices, the method comprising:
   at an LTE multi-UE simulator distinct from an evolved node B and user equipment:
      at a common public radio interface (CPRI) module, receiving downlink data associated with multiple UEs simulated by the LTE multi-UE simulator from an evolved node B (eNode B) under test;
      at a downlink signal chain processing module including a common section and a UE specific section performing, in the common section, UE agnostic processing of the downlink data and performing, in the UE specific section, UE specific processing of the downlink data for each of the multiple UEs simulated by the LTE multi-UE simulator; and
      at a control digital signal processor (DSP), receiving the downlink data from the common section of the downlink signal chain processing module, processing the downlink data to obtain control information, and forwarding the control information to the downlink signal chain processing module, wherein the UE specific section performs the UE specific processing using the control information.

14. The method of claim 13 wherein the common section includes a bus interface for receiving the downlink data from the CPRI module, a cyclic data, and a channel estimation and equalization block for performing channel estimation and equalization of a signal carrying the downlink data.

15. The method of claim 13 wherein the UE specific section includes a plurality of control signal processing blocks to process control signals present in the downlink data, an interface for communicating with the control DSP, a code block segmentation and scheduler for segmenting the downlink data into code blocks, and a rate dematcher for deinterleaving the downlink data in the code blocks.

16. The method of claim 13 wherein the LTE multi-UE simulator comprises a downlink channel decoder for receiving the downlink data from the downlink signal chain processing module and for performing decision directed routing at the downlink channel decoder for sending a first portion of the downlink data to the control DSP and for sending a second portion of the downlink data to a radio link control (RLC) and medium access control (MAC) module for further processing.

17. The method of claim 16 wherein the first portion of the downlink data includes random access response (RAR) data and wherein the second portion of the downlink data includes RLC/MAC data other than the RAR data.

18. The method of claim 17 wherein the control DSP imbeds a descriptor in the control information returned to the downlink signal chain processing module, wherein the downlink signal chain processing module forwards the descriptor to the downlink channel decoder, and wherein the downlink channel decoder uses the descriptor in identifying the RAR data and the RLC/MAC data other than the RAR data.

19. The method of claim 16 wherein the downlink channel decoder comprises a Turbo decoder.

20. The method of claim 13 wherein the UE specific section is configured to process downlink data for a plurality of different channels corresponding to a plurality of UEs being simulated by the LTE multi-UE simulator.

21. The method of claim 17 wherein the control DSP processes the RAR data to extract uplink grant information, wherein the LTE multi-UE simulator comprises an uplink DSP for receiving uplink grant information from the control DSP and using the uplink grant information to generate uplink transport blocks, and wherein the LTE multi-UE simulator further includes an uplink signal chain processing module for receiving the uplink transport blocks and sending the uplink transport blocks to the CPRI module.

22. The method of claim 21 wherein the uplink signal chain processing module includes a UE-specific section for performing UE-specific processing of the uplink transport blocks and a UE-agnostic section for performing UE-agnostic processing of the uplink transport blocks.

23. The method of claim 21 wherein the uplink and downlink signal chain processing modules are implemented using separate field programmable gate arrays (FPGAs).

24. The method of claim 13 wherein the control DSP is configured to process the downlink data and return the control information to the downlink signal chain processing module within 400 microseconds.

25. A non-transitory computer readable medium having stored thereon executable instructions that when executed by a processor of a computer controls the computer to perform steps comprising:
  at an LTE multi-UE simulator distinct from an evolved node B and user equipment (UE):
    at a common public radio interface (CPRI) module, receiving downlink data associated with multiple UEs simulated by the LTE multi-UE simulator from an evolved node B (eNode B) under test;
    at a downlink signal chain processing module including a common section and a UE specific section performing, in the common section, UE agnostic processing of the downlink data and performing, in the UE specific section, UE specific processing of the downlink data for each of the multiple UEs simulated by the LTE multi-UE simulator; and
    at a control digital signal processor (DSP), receiving the downlink data from the common section of the downlink signal chain processing module, processing the downlink data to obtain control information, and forwarding the control information to the downlink signal chain processing module, wherein the UE specific section performs the UE specific processing using the control information.

* * * * *